(12) United States Patent
Mikkelsen et al.

(10) Patent No.: US 8,221,666 B2
(45) Date of Patent: Jul. 17, 2012

(54) COMPOSITE STRUCTURE AND METHOD FOR PRODUCING A COMPOSITE STRUCTURE

(75) Inventors: Tommy Mikkelsen, Rødding (DK); Morten Stage, Rødding (DK)

(73) Assignee: LM Glasfiber A/S, Kolding (DK)

( * ) Notice: Subject to any disclaimer, the term of this patent is extended or adjusted under 35 U.S.C. 154(b) by 0 days.

(21) Appl. No.: 12/452,373

(22) PCT Filed: Jun. 27, 2008

(86) PCT No.: PCT/DK2008/000245
§ 371 (c)(1),
(2), (4) Date: Mar. 26, 2010

(87) PCT Pub. No.: WO2009/003477
PCT Pub. Date: Jan. 8, 2009

(65) Prior Publication Data
US 2010/0209651 A1    Aug. 19, 2010

(30) Foreign Application Priority Data
Jun. 29, 2007    (DK) .................................. 2007 00947

(51) Int. Cl.
*B29C 70/00*    (2006.01)

(52) U.S. Cl. ............ 264/257; 264/85; 264/82; 264/101; 264/102; 264/234; 264/345; 264/571; 425/500; 425/503; 425/504; 425/130; 425/383; 425/387.1; 425/388; 425/389

(58) Field of Classification Search .................. 264/257, 264/85, 82, 101, 102, 234, 345, 571; 425/500, 425/503, 504, 130, 383, 387.1, 388, 389
See application file for complete search history.

(56) References Cited

U.S. PATENT DOCUMENTS

| | | | |
|---|---|---|---|
| 4,942,013 A | | 7/1990 | Palmer et al. |
| 5,702,663 A | * | 12/1997 | Seemann ....................... 264/510 |
| 5,939,013 A | * | 8/1999 | Han et al. ....................... 264/510 |
| 2004/0046291 A1 | * | 3/2004 | Johnson et al. ............... 264/510 |

FOREIGN PATENT DOCUMENTS

DE    102 03 975 C1    1/2003
(Continued)

*Primary Examiner* — Christina Johnson
*Assistant Examiner* — Saeed Huda
(74) *Attorney, Agent, or Firm* — The Nath Law Group; Jerald L. Meyer; Robert T. Burns (57) ABSTRACT

A method for producing a composite structure and a composite structure obtained by the method is described. The method comprises the following steps: a) providing a mold comprising a rigid mold part and a flexible vacuum bag, b) placing a fiber insertion in the mold part, the fiber insertion including a plurality of fiber layers and, when placed in the mold part, having an upper surface and a lower surface as well as a first side and a second side, the fiber insertion including a first zone at the first side and a second zone at the second side, the first zone and the second zone being separated by an intermediate zone, c) placing an upper distribution medium above the intermediate zone of the fiber insertion, the distribution medium comprising a resin distribution network for distributing resin along the upper distribution medium, d) placing a number of resin inlet channels above the upper distribution medium for supplying liquid resin to the resin distribution network, e) placing a first vacuum outlet at least partially overlapping the first zone of the fiber insertion and a second outlet at least partially overlapping the second zone of the fiber insertion, f) placing the vacuum bag on top of the mold part, thus sealing the vacuum bag against the mold part to define a mold cavity, g) evacuating the mold cavity, h) connecting a source of uncured fluid resin to the resin inlet channels so as to feed uncured resin to the resin distribution network in order to fill the mold cavity and to impregnate at least the fiber insertion and the upper distribution medium with uncured resin, and i) allowing the resin to cure in order to form the composite structure.

13 Claims, 8 Drawing Sheets

FOREIGN PATENT DOCUMENTS

| | | | |
|---|---|---|---|
| EP | 1 162 058 A1 | 12/2001 | |
| EP | 1162058 A1 * | 12/2001 | |
| EP | 1 304 211 A1 | 4/2003 | |
| WO | WO 96/40488 | 12/1996 | |
| WO | WO 2006/058540 A1 | 6/2006 | |
| WO | WO 2007/098769 A1 | 9/2007 | |

* cited by examiner

COMPOSITE STRUCTURE AND METHOD FOR PRODUCING A COMPOSITE STRUCTURE

This is a U.S. national phase Application filed under 35 U.S.C. 371 of PCT/DK2008/000245, filed 27 Jun. 2008 claiming priority benefit from DK Application No. PA 2007 00947, filed 29 Jun. 2007, the entire content of which is hereby incorporated by reference.

TECHNICAL FIELD

The present invention relates to a method for producing a composite structure comprising fibre reinforced material by means of vacuum assisted resin transfer moulding, where the fibre reinforced material is impregnated with liquid resin. Furthermore, the invention relates to a composite structure obtained by the method.

BACKGROUND

Thus the invention relates to a method for producing fibre composite structures and composite structures obtained by means of VARTM (vacuum assisted resin transfer moulding), where liquid polymer, also called resin, is filled into a mould cavity, in which fibre material priorly has been inserted, as a vacuum is generated in the mould cavity hereby drawing in the polymer. The polymer can be thermoset plastic or thermoplast.

Vacuum infusion or VARTM is a process used for moulding fibre composite mouldings, where uniformly distributed fibres are layered in one of the mould parts, the fibres being rovings, i.e. bundles of fibre bands, bands of rovings or mats, which are either felt mats made of individual fibres or woven mats made of fibre rovings. The second mould part is often made of a resilient vacuum bag, and is subsequently placed on top of the fibre material. By generating a vacuum, typically 80 to 95% of the total vacuum, in the mould cavity between the inner side of the mould part and the vacuum bag, the liquid polymer can be drawn in and fill the mould cavity with the fibre material contained herein. So-called distribution layers or distribution tubes, also called inlet channels, are used between the vacuum bag and the fibre material in order to obtain as sound and efficient a distribution of polymer as possible. In most cases the polymer applied is polyester or epoxy, and the fibre reinforcement is most often based on glass fibres or carbon fibres.

During the process of filling the mould, a vacuum, said vacuum in this connection being understood as an underpressure or negative pressure, is generated via vacuum outlets in the mould cavity, whereby liquid polymer is drawn into the mould cavity via the inlet channels in order to fill said mould cavity. From the inlet channels the polymer disperses in all directions in the mould cavity due to the negative pressure as a flow front moves towards the vacuum channels. Thus it is important to position the inlet channels and vacuum channels optimally in order to obtain a complete filling of the mould cavity. Ensuring a complete distribution of the polymer in the entire mould cavity is, however, often difficult, and accordingly this often results in so-called dry spots, i.e. areas with fibre material not being sufficiently impregnated with resin. Thus dry spots are areas where the fibre material is not impregnated, and where there can be air pockets, which are difficult or impossible to remove by controlling the vacuum pressure and possibly an overpressure at the inlet side. In connection with vacuum infusion, employing a rigid mould part and a resilient mould part in the form of a vacuum bag, the dry spots can be repaired after the process of filling the mould by for example puncturing the bag in the respective location and by drawing out air for example by means of a syringe needle. Liquid polymer can optionally be injected in the respective location, and this can for example be done by means of a syringe needle as well. This is a time-consuming and tiresome process. In the case of large mould parts, staff have to stand on the vacuum bag. This is not desirable, especially not when the polymer has not hardened, as it can result in deformations in the inserted fibre material and thus in a local weakening of the structure, which can cause for instance buckling effects.

Patent literature discloses examples of the use of a semi-permeable membrane, which increases the area, in which the vacuum is active, and thus reduces the above problems. In this connection the term semi-permeable membrane means a membrane, which is permeable to gasses but impermeable to liquid polymer. Thus if a semipermeable membrane is placed across the fibre insertion, air pockets can be removed more easily or prevented entirely.

Typically the composite structures comprise a core material covered with a fibre rein-forced material, such as one or more fibre reinforced polymer layers. The core material can be used as a spacer between such layers to form a sandwich structure and is typically made of a rigid, lightweight material in order to reduce the weight of the composite structure. In order to ensure an efficient distribution of the liquid resin during the impregnation process, the core material may be provided with a resin distribution network, for instance by providing channels or grooves in the surface of the core material. EP 0 831 987 and EP 0 1304 211 disclose a method and a composite structure, respectively, in which such a core material is used.

As for instance blades for wind turbines have become bigger and bigger in the course of time, and may now be more than 60 meters long, the impregnation time in connection with manufacturing such blades has increased, as more fibre material has to be impregnated with polymer. Furthermore the infusion process has become more complicated, as the impregnation of large shell members, such as blades, requires control of the flow fronts to avoid dry spots, said control may e.g. include a time-related control of inlet channels and vacuum channels. This increases the time required for drawing in or injecting polymer. As a result the polymer has to stay liquid for a longer time, normally also resulting in an increase in the curing time.

WO 2007/098769 describes one method for optimising the process of producing composite structure.

It is an object of the present invention is to provide a new and improved method of manufacturing a shell member of fibre composite material by means of vacuum infusion.

DISCLOSURE OF THE INVENTION

According to a first aspect of the invention, this is obtained by the method comprising the following steps:
a) providing a mould comprising a rigid mould part and a flexible vacuum bag,
b) placing a fibre insertion in the mould part, the fibre insertion including a plurality of fibre layers and, when placed in the mould part, having an upper surface and a lower surface as well as a first side and a second side, the fibre insertion including a first zone at the first side and a second zone at the second side, the first zone and the second zone being separated by an intermediate zone,
c) placing an upper distribution medium above the intermediate zone of the fibre insertion, the distribution medium comprising a resin distribution network for distributing resin along the upper distribution medium, d) placing a number of resin inlet channels above the upper distribution medium for supplying liquid resin to the resin distribution network, e) placing a first vacuum outlet at least partially overlapping the first zone of the fibre insertion and a second outlet at least partially overlapping the second zone of the fibre insertion, f) placing the vacuum bag on top of the mould part, thus sealing the vacuum bag against the mould part to define a mould cavity, g) evacuating the mould cavity, h) connecting a source of uncured fluid resin to the resin inlet channels so as to feed uncured resin to the resin distribution network in order to fill the mould cavity and to impregnate at least the fibre insertion and the upper distribution medium with uncured resin, and i) allowing the resin to cure in order to form the composite structure.

The terms "distribution medium" or "distribution layer" are to be understood as a layer, which allows a higher flow speed for liquid polymer than the fibre insertion does. The resin distribution network can be provided by being made of a porous material or at least being highly permeable to liquid resin. The upper distribution medium ensures that the resin is distributed quickly along the fibre insertion above the intermediate zone, thus ensuring that a broad flow front of resin is distributed through the intermediate zone of the fibre insertion during impregnation as well as towards the vacuum outlets.

The combination of the centrally positioned upper distribution layer and the vacuum outlets ensures that the overall time for fully impregnating the fibre insertion is reduced compared to known techniques. Composite structures such as wind turbine blades have over the years become longer and longer and some wind turbine blades are today up to 60 meters or even longer (and blades of a 100 meters or more are contemplated). Therefore, it has become increasingly important to optimise the production of such blades. Even small reductions in the amount of time needed for the different stages of the production of the blades can make the difference on whether for instance three or four working shifts are needed in order to fabricate the blade. Thus, even small reductions of the amount of time needed for each production stage can significantly reduce the necessary man-hours and thereby the overall production cost.

Typically, the evacuation process reduces the vacuum level to 80-95% vacuum, i.e. an underpressure or negative pressure. Upon injection of the liquid resin, the vacuum may be reduced slightly. Preferably, the forming structure is evacuated by means of at least the first and the second vacuum outlet.

According to a first embodiment of the method, a lower distribution medium is provided below the fibre insertion, the lower fibre layer at least partially overlapping the first zone and the second zone. The lower distribution medium ensures that the overall impregnation time may be reduced even further and furthermore reduces the probability of formation of air pockets, since the flow fronts are drawn in under the first zone and the second zone. Thus, the flow front of liquid resin first propagates downwards through the intermediate zone of the fibre insertion. When the flow front reaches the lower distribution medium, the flow front is drawn in under the vacuum outlets, and the flow front subsequently moves up through the first zone and the second zone, respectively. In an advantageous embodiment, the lower distribution medium overlaps substantially the entire fibre insertion and can even extend beyond the fibre insertion.

According to another embodiment of the method, the upper distribution medium is formed as a load distributing plate-like element. Preferably, the plate-like element is extending longitudinally and centrally above the intermediate zone of the fibre insertion.

The plate-like distribution medium, which may become part of the finished composite structure, reduces the load or force with which the resin inlet channels normally influence the fibre laminate, when the vacuum bag presses the inlet channels against the fibre insertion or fibre layers during evacuation and impregnation. The load is reduced since the forces are applied over the bottom surface of the plate-like distribution medium and thus over a much greater area. Hereby, the formation of stress lines or areas is avoided, which during subsequent use of the composite structure could cause a buckling effect. Additionally, it is preferred that the plate-like distribution medium becomes part of the composite structure, since the removal of the distribution medium also could cause the formation of impressions and thus cause areas of reduced strength.

Preferably, the plate-like element is essentially rigid in order to equalize the pressure over the entire lower surface of the element. According to yet another embodiment, the upper distribution medium is made of a lightweight, essentially rigid material, such as balsa wood or foamed polymer. However, it is not essential that the upper distribution medium is rigid. What is important is that it equalises the pressure over the lower surface of the medium and that the resin is quickly distributed along the entire medium before the flow front propagates downwards through the intermediate zone. Therefore, the upper distribution medium can also be slightly resilient as long as it equalises the pressure over the lower surface.

According to an advantageous embodiment, the upper distribution medium, when placed above the fibre insertion, comprises an upper surface and a lower surface, a number of first grooves being formed in the upper surface of the distribution medium and a number of second grooves being formed in the lower surface of the distribution medium.

The upper grooves are normally arranged along a longitudinal direction of the finished composite structure or equivalently the plate-like distribution medium, while the second grooves are aligned in a transverse direction of the composite structure. Thus, these grooves constitute at least part of the resin distribution network. The first grooves are used to distribute the liquid resin along the entire longitudinal direction of the fibre insertion and the second grooves are used to distribute the liquid resin over the entire width of the intermediate zone.

The plate-like distribution medium can be provided with a number of through-going holes extending from the upper surface to the lower surface in order to be able to supply liquid resin from the upper surface to the lower surface.

According to another advantageous embodiment, the plate-like distribution medium comprises a first side and a second side, wherein the distribution medium is tapered towards the first side and/or the second side. Thereby, it is ensured that a gradual transition between different materials having different strengths is obtained, thus minimising the probability of formation of stress lines or areas and thus also reducing the probability of buckling effects for the finished composite structure.

In one embodiment according to the invention, the fibre insertion has a first width and the plate-like distribution medium has a second width, wherein the ratio between the second width and the first width is 15-60% or alternatively 17-55% or alternatively 25-50%. Thus, the flow front propagating downwards through the fibre insertion also has a width corresponding to the mentioned ratio intervals. The exact ratio should be chosen in order to optimise the total time for achieving a full impregnation of the fibre insertion. The ratio is normally defined by the width of the lower side of the upper distribution medium and the width of the upper side of the fibre insertion.

In another embodiment, a plurality of fibre layers is placed in the mould part prior to step b), and preferably also a gel coat defining the exterior of the composite structure. Additionally a waxy substance may be applied to the inner surface of the mould part in order to prevent the composite structure to adhere to the surface.

In yet another embodiment, a plurality of fibre layers is placed in the mould cavity between steps c) and d), said plurality of fibre layers defining the interior of the composite structure.

According to one embodiment, the first vacuum outlet and second vacuum outlet are formed by a first vacuum channel and second vacuum channel, respectively. The vacuum channels can be positioned adjacent the upper distribution layer, and preferably such that the channels substantially overlap the entire first zone and second zone of the fibre insertion, respectively.

According to another embodiment, the fibre insertion constitutes a main laminate, which is a longitudinally extending reinforcement section in a blade shell half for a blade of a wind turbine. Thus, the upper distribution and the vacuum channels also extend in the longitudinal direction.

According to one embodiment, the fibre insertion is 5-100 mm, 7-80 or 10-50 mm thick. According to an advantageous embodiment the width of the fibre insertion is between 50-2000 mm, 100-1750 mm or 150-1500 mm wide. The width and thickness may differ in the longitudinal direction of the shell part.

The width of the upper distribution medium can also differ in the longitudinal direction of the shell half part. Typically, the fibre insertion and the upper distribution medium are typically relatively wide near the blade root and become narrower towards the blade tip.

The resin inlet channels can be formed as omega profiles, i.e. round channels with a slit in the bottom. These channels are usually made of a relatively rigid material, such as polyamide. Therefore, the "legs" of the omega profile would normally apply a relatively high concentrated pressure on the main laminate or fibre insertion, had the plate-like upper distribution medium not been used.

According to a preferred embodiment, additionally a core material is provided adjacent the first side of the fibre insertion and adjacent the second side of the fibre insertion.

According to an advantageous embodiment, one or more additional resin inlet channels are placed above the core material. That is, one or more resin inlet channels are placed over a first core material at the first side of the fibre insertion, and one or more resin inlet channels are placed over a second core material at the second side of the fibre insertion. These resin inlet channels can also be formed as omega profiles.

The core material is preferably made of a rigid, lightweight material such as balsa wood or foamed polymer. Typically, a combination of balsa wood and foamed PVC is used in order to optimise the weight of the composite structure.

The core material and/or the upper distribution medium can comprise a number of first grooves formed in a first surface, where the first grooves extend nearly all the way through the core material or the distribution medium to a second surface, such that the distance between a bottom of the first grooves and the second surface is of such a size that the core block is flexible along the first grooves. The core material and/or the upper distribution medium can comprise a number of first grooves formed in a first surface and having a first height, and a number of second grooves in a second surface and having a second height, the sum of the first and the second height being larger than the thickness of the core material and/or the upper distribution medium, the first grooves and second grooves being arranged so that they cross each other. Thereby, liquid resin can be distributed from the first surface to the second surface.

In one embodiment according to the invention, resin is first supplied via the resin inlet channels above the upper distribution medium for a predetermined amount of time. Thereafter the resin is supplied also via the resin inlet channels above the core material. This ensures that resin does not propagates too quickly through the core material having a much higher permeability than the fibre insertion and assembles too quickly at the vacuum channels arranged over the first zone and the second zone of the fibre insertion.

Additionally, vacuum channels may be provided at the rim of the mould part in order to ensure that the core material, the fibre layers and optional reinforcement sections at the leading edge and trailing edge of the finished blade shell half part are impregnated with resin.

The object of the invention is also achieved by a composite structure obtainable by use of the afore-described methods.

According to one embodiment, the composite structure has a longitudinal direction and a transverse direction, and the composite structure comprises:
- a longitudinally extending fibre insertion having a plurality of fibre layers and having a first surface and a second surface as well as a first side and a second side, the fibre insertion including a first zone at the first side and a second zone at the second side, the first zone and the second zone being separated by an intermediate zone, and
- a distribution medium arranged adjacent the intermediate zone of the fibre insertion, the distribution medium comprising a resin distribution network, and wherein
- at least the resin distribution network and the fibre insertion are impregnated by cured resin.

Thus, the mentioned zones extend from the first surface to the second surface of the fibre insertion.

According to one embodiment, the composite structure additionally comprises a first core material at the first side of the fibre insertion and a second core material at the second side of the fibre insertion. According to another embodiment, the structure additionally comprises one or more fibre layers at a first surface of the composite structure and one or more fibre layers at a second surface of the composite structure. These are of course impregnated with cured resin. The first surface can define the inner surface of for instance a wind turbine shell half part, while the second surface can define the outer surface of the wind turbine shell half part. Alternatively, the outer surface can be defined by a gel coat applied on top of the fibre layer(s). The core material can be provided with channels or grooves filled with cured resin. These resin-filled channels can prevent subsequent delamination of the composite structure.

BRIEF DESCRIPTION OF THE DRAWINGS

The invention is explained in detail below with reference to an embodiment shown in the drawings, in which FIG. 1 is a schematic view of a wind turbine shell part, seen from above, FIG. 2 a schematic cross section through a mould part with fibre layers and core material placed in the mould part, FIG. 3 a schematic view of a first core block according to the invention, seen in perspective, FIG. 4 a cut along line A-A in FIG. 3, FIG. 5 the core block shown in FIG. 4 being slightly flexed, FIG. 6 a cut along line B-B in FIG. 3, FIG. 7 a first composite structure according to the invention, FIG. 8 a second composite structure according to the invention, FIG. 9 a schematic view of a second core block according to the invention, seen in perspective, FIG. 10 a schematic cross section through an arrangement for carrying out a method according to the invention.

DETAILED DESCRIPTION OF THE INVENTION

Figure 1:
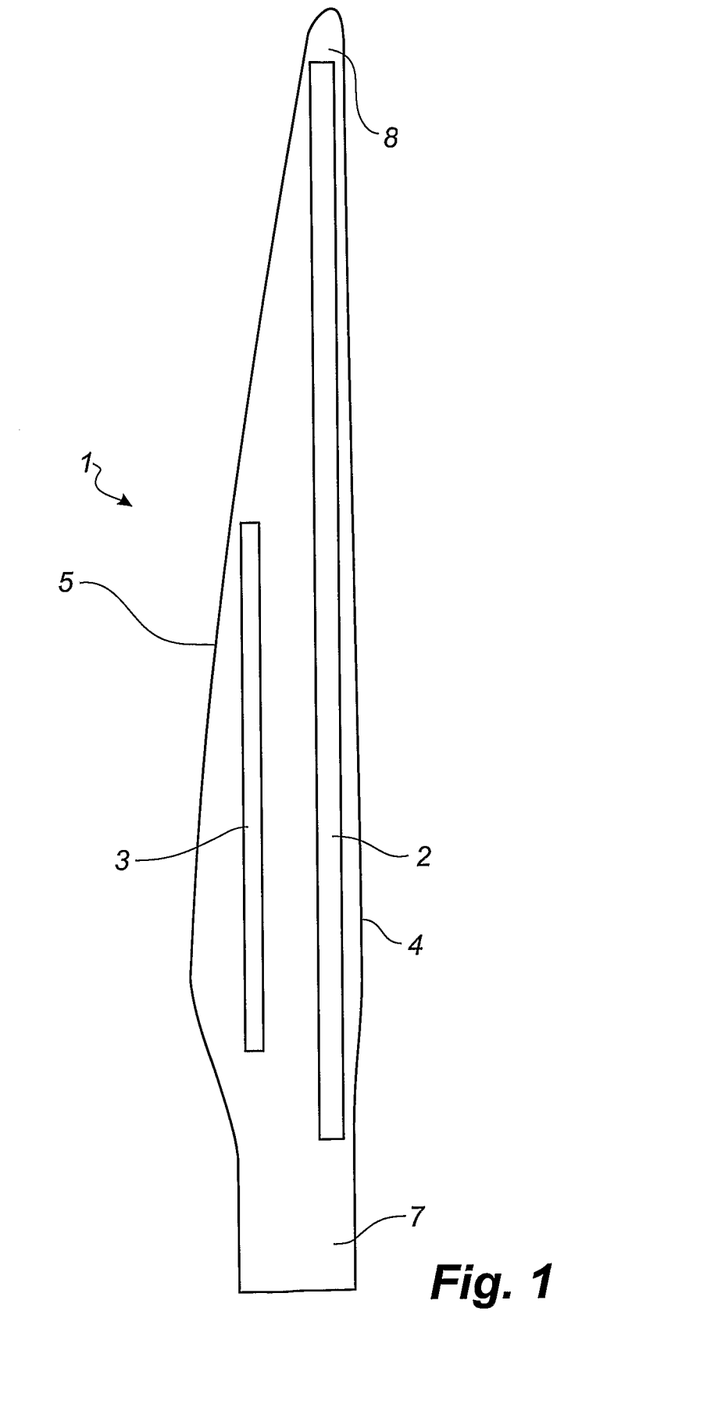

FIG. 1 shows a wind turbine blade shell part 1 seen from above. The shell part comprises a first fibre insertion 2, also called the main laminate, which extends along at least a part of the longitudinal direction of the shell part 1. The main laminate 2 functions as a reinforcement section for the finished wind turbine blade.

The main laminate 2 extends from the blade root 7 to the tip end 8. The main laminate is here depicted as having a uniform width; however, typically the main laminate has a varying width and becomes narrower towards the tip end 8 of the shell part 1. For large wind turbine blade, such as the LM61.5 blade, the shell parts may additionally comprise a second fibre insertion 3, also called the small main laminate. Additionally, the shell part 1 may comprise reinforcement sections, such as fibre insertions, at a leading edge 4 and a trailing edge 5 of the wind turbine blade shell part 1, respectively.

Figure 2:
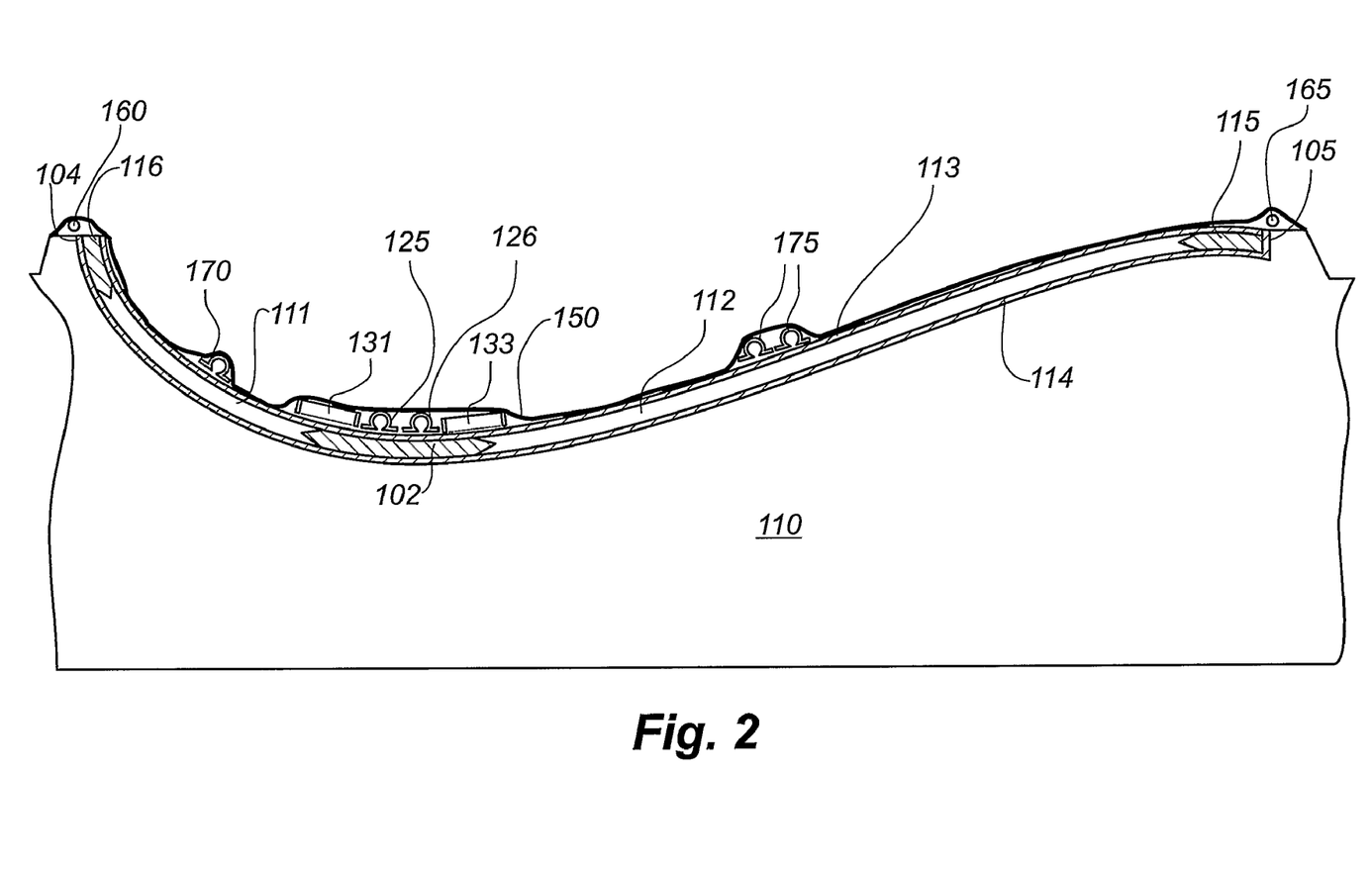

FIG. 2 shows a cross-sectional view through a mould part 110 having a mould cavity, in which a number of fibre layers, core parts and reinforcement sections are placed, these parts being included in a finished wind turbine shell part. FIG. 2 is only used to show the relative placement of all these parts in a wind turbine shell part and an example of how to arrange resin inlet channels and vacuum outlets. The blade shell part comprises one or more lower fibre layers 114 impregnated with resin and optionally coated with a gel-coat, which define the exterior surface of the shell part, and one or more upper fibre layers 113 impregnated with resin, and which define the interior surface of the shell part. The upper fibre layer(s) 113 and lower fibre layer(s) 114 are separated by a fibre insertion or main laminate 102 comprising a plurality of fibre layers impregnated with resin, a first core part 111 and a second core part 112, as well as a first fibre reinforcement 115 at a trailing edge 105 of the shell part and a second fibre reinforcement 116 at a leading edge 106 of the shell part.

The arrangement for the VARTM process comprises a number of vacuum outlets, where a first vacuum outlet 131 and a second vacuum outlet 133 are placed above the main laminate 102 as well as a first additional vacuum outlet 160 and a second additional vacuum outlet 165 arranged at rims or flanges of the rigid mould part 110, i.e. at the leading edge 104 and trailing edge 105 of the finished blade shell part, respectively.

The resin is supplied via a number of resin inlet channels 125, 126 arranged above the main laminate as well as a number of first additional resin channels 170 above the first core part 111 and a number of second additional resin channels 175 arranged above the second core part 112.

The shell part is in FIG. 2 depicted as having a uniform thickness. However, typically the shell part is thickest around the main laminate 102 and becomes thinner towards the leading edge 104 and the trailing edge 105. The shell part is here depicted as having only one main laminate, but it may comprise a second or small main laminate as well, in which case the shell part also comprises a third core part.

Figure 3:
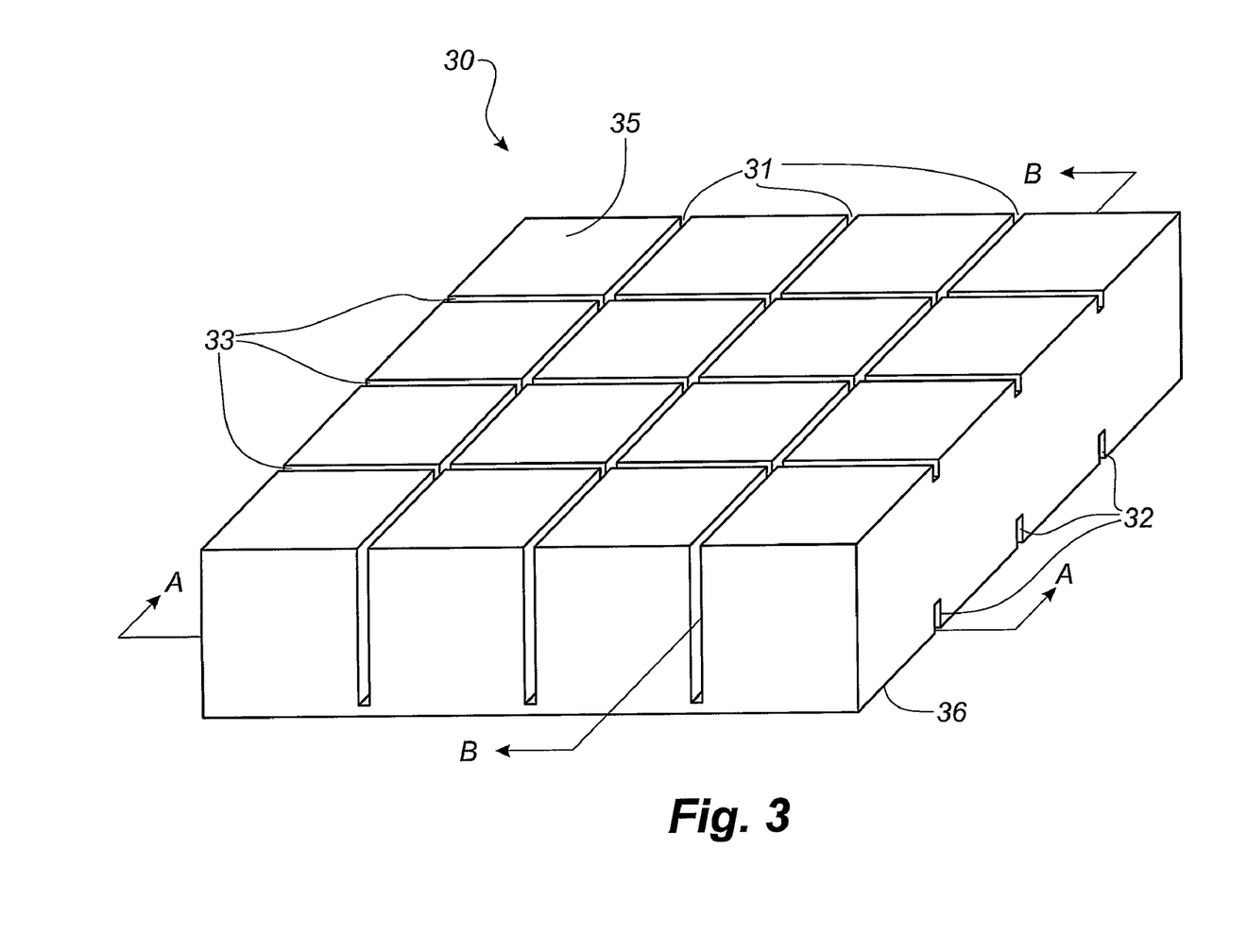
Figure 4:
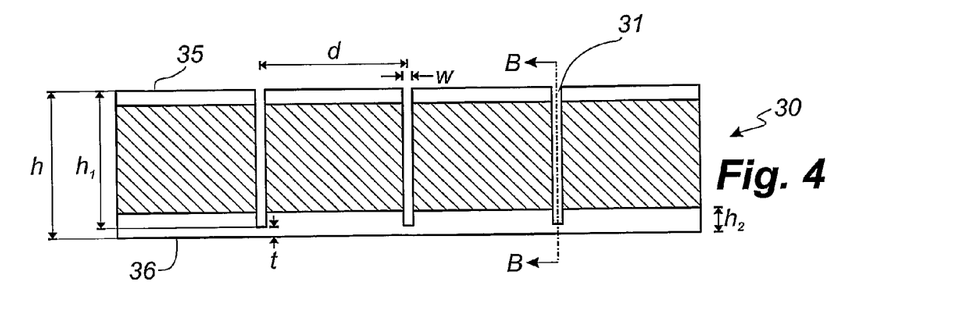
Figure 6:
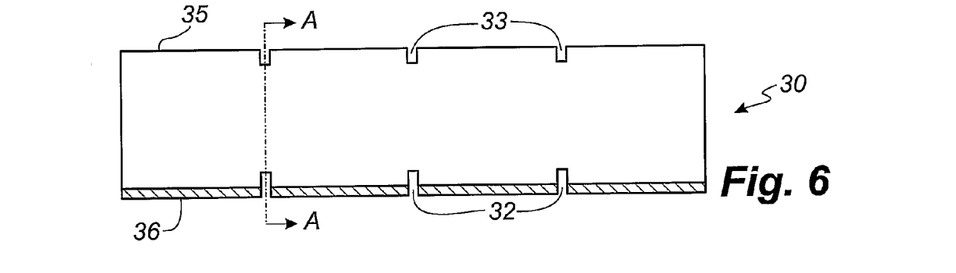

FIG. 3 shows a core block 30 according to the invention, which can be used for the core part of a wind turbine shell part as shown in FIG. 1 or 2 or for a sandwich structure in general. FIGS. 4 and 6 show cross sections of the core block along lines A-A and B-B, respectively.

The core block 30 comprises a first surface 35 and a second surface 36. A number of substantially parallel first grooves 31 are formed in the first surface 35. The core blocks 30 are typically arranged such that the first grooves extend in the longitudinal direction of the composite structure or sandwich structure of which the core blocks 30 are part. A number of second grooves 32 are formed in the second surface 36 of the core block. The second grooves 32 are arranged substantially transverse to the first grooves 31. Furthermore, a number of additional grooves 33 are formed in the first surface 35 of the core block. These are also arranged transverse to the first grooves 31. The additional grooves 33 may as shown in FIG. 3-6 be arranged in the same planes as the second grooves 32. However, this is not necessary, and the grooves may be mutually displaced in the longitudinal direction of the core block 30.

The first grooves 31 have a first depth $h_1$, and the second grooves 32 have a second depth $h_2$, while the total thickness of the core block 30 is given by h. The distance from the bottom of the first grooves 31 to the second surface 36 of the core block 30 is denoted t (which is equal to h minus $h_1$). The distance between adjacent grooves is denoted d, and the widths of the individual grooves are denoted w. Normally, the individual grooves have the same width and spacing, however, these dimensions may vary in order to optimise the distribution of liquid resin.

The core block 30 is made of a rigid, lightweight material, such as balsa wood or foamed polymer, for instance foamed polyvinyl chloride (PVC).

Figure 5:
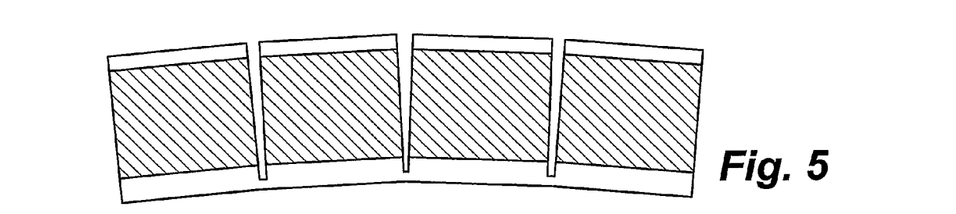

The first grooves 31 extend nearly all the way through the block, such that the distance between the bottom of the first grooves 31 and the second surface 36 is of such a thickness t that the core block is flexible or bendable about axes extending in the longitudinal direction along the first grooves 31. FIG. 5 shows an example of the core block 30 being bent about these axes. Thereby, the core blocks can be formed according to the mould part, in which they are placed, and be formed according to the surface of the mould cavity, when a vacuum is applied to the mould cavity.

Further, the second grooves 32 may extend nearly all the way through the block, such that the distance between the bottom of the second grooves 32 and the first surface 36 is of such a thickness that the core block is flexible or bendable about axes extending in the transverse direction along the second grooves 32.

Figure 7:
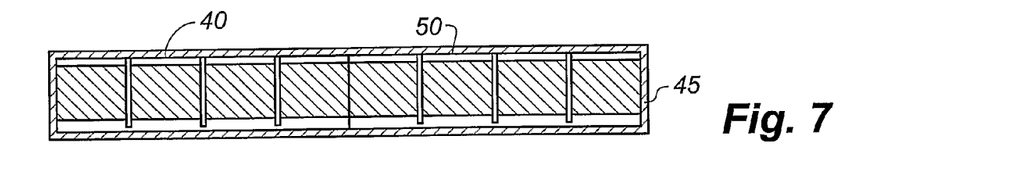
Figure 8:
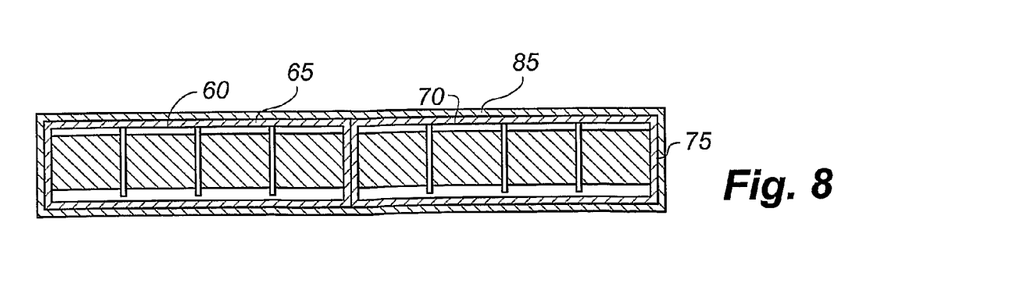

FIGS. 7 and 8 show examples of using such core blocks for sandwich structures. FIG. 7 shows a first sandwich structure comprising a first core block 40 and a second core block 50, which are covered by a first fibre layer 45. The sandwich structure is depicted with the sides of the first core block 40 and the second core block 50 abutting each other. However, the core blocks may also be arranged with a small mutual spacing for distributing resin. Preferably, the individual core blocks are arranged such that grooves of one core block are aligned with grooves of the other core block in order to obtain an efficient distribution of resin during the impregnation process.

The grooves of the core blocks 40, 50 and the first fibre layer 45 are filled with cured resin, and the resin in the grooves helps to prevent delamination of the composite sandwich structure. The sandwich structure may of course also comprise only one core block or comprise three or more core blocks, and the blocks can have varying surface thicknesses in order to obtain the desired shape for the composite structure.

FIG. 8 shows a second sandwich structure. In this embodiment, each core block is covered by a separate fibre layer. Thus, the second sandwich structure comprises a first core block 60 covered by a first fibre layer 65 and a second core block 70 covered by a second fibre layer 75. These two blocks are covered by an additionally fibre layer 85.

When making large composite structures, such as the wind turbine shell parts shown in FIGS. 1 and 2, the core parts often comprise core blocks of different materials in order to optimise the weight and strength of the composite structure. The core parts may for instance comprise core blocks of balsa wood and foamed PVC, respectively.

Since, balsa wood and foamed PVC have different rigidities and densities, the combination of such core blocks may give rise to boundaries, where the strength of the sandwich structure is different on either side. Such discontinuities may give rise to local weaknesses due to stress lines or areas during use of the composite structure, especially if the structure is a wind turbine blade. Such areas with discontinuous strength increase the probability of buckling effects of the composite structure. Therefore, the core blocks which form boundaries to core blocks of a different material or strength are typically tapered in order to obtain a gradual transition from one type of core material to another.

Figure 9:
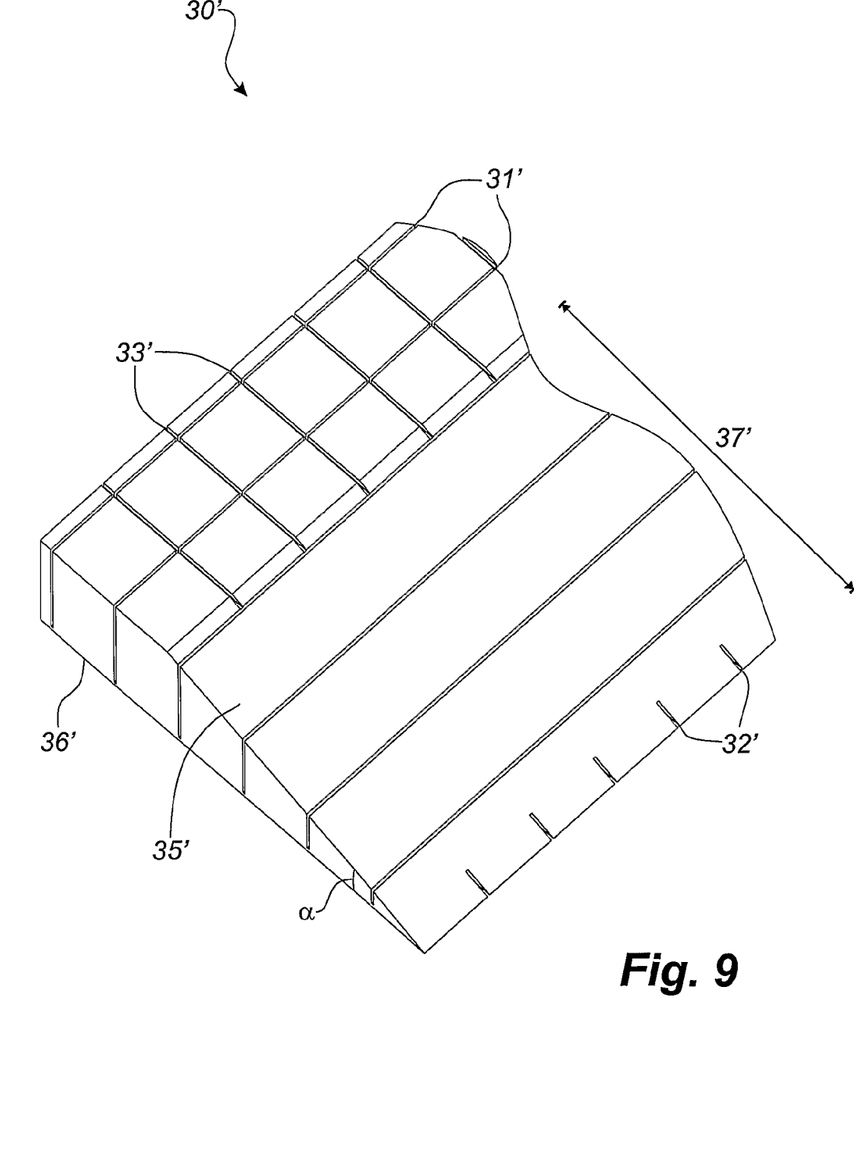

Such a core block 30' with a tapered region 37' is depicted in FIG. 9. This core block 30' also comprises a number of substantially parallel first grooves 31' formed in a first surface 35' of the core block 30'. As with the core block depicted in FIG. 3, the tapered core block 30' also comprises a number of transverse arranged second grooves 32' formed in a second surface of the core block 30'. The core block 30' additionally comprises a number of transverse arranged additional grooves 33' formed in the first surface 35' of the core block 30'. The tapered region 37' is tapered with an angle $\alpha$.

From FIG. 9 it is seen that the height ($h_1$) of the first grooves 31' and the height of the core block (h) may vary for instance in the transverse direction of the core block 30, whereas the distance (t) between the bottom of the first grooves 31' and the second surface 36' of the core block 30' is substantially constant. Of course small fabrication variations may occur.

The grooves of the core block can for instance be made by cutting by use of a CNC cutter or milling machine. The grooves are in FIG. 3-9 depicted as having square sides; however, the may also be slightly tapered in order to be more bendable or flexible in the other direction of the one depicted in FIG. 5.

Figure 10:
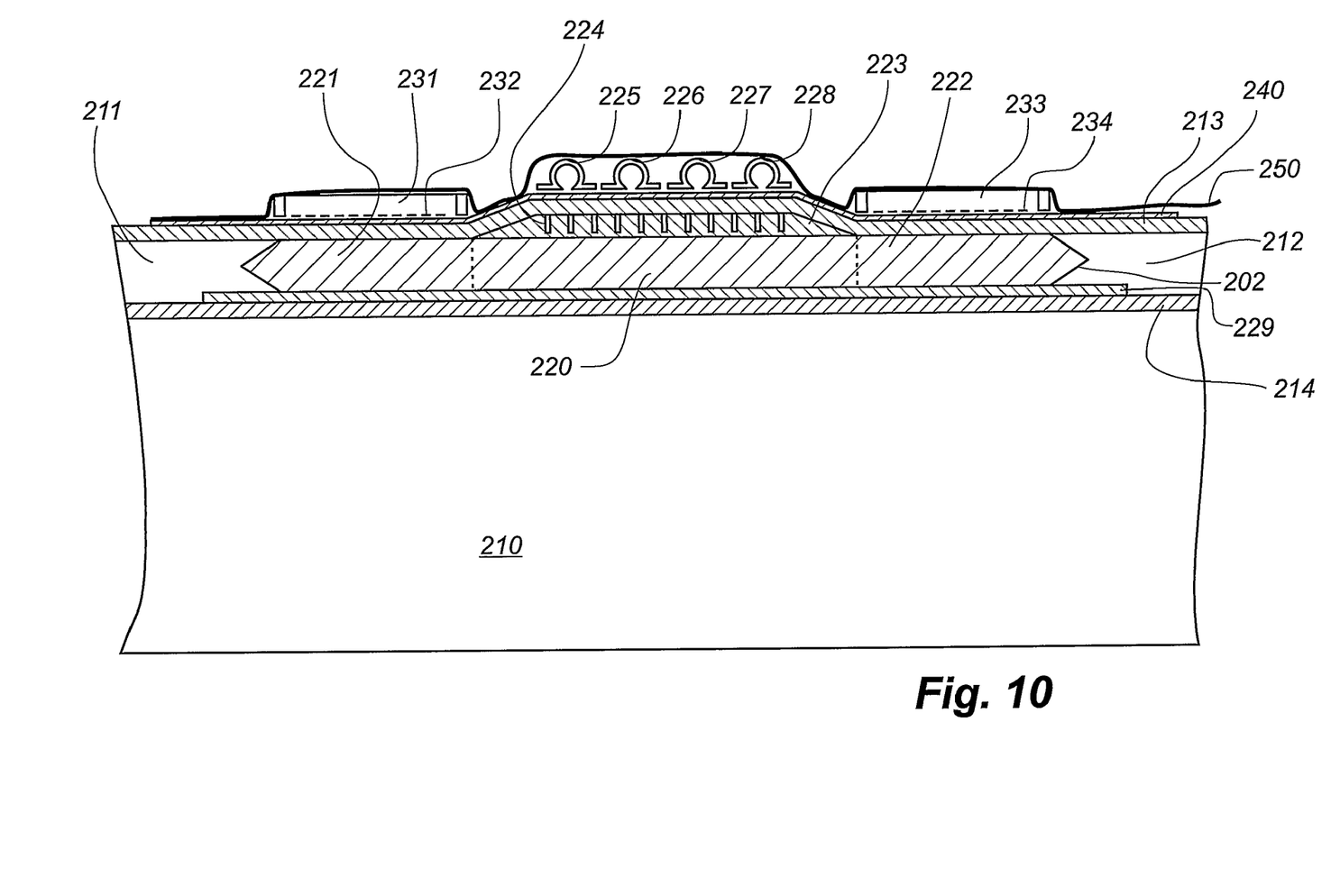

FIG. 10 shows a cross section through a mould for manufacturing a blade shell half for a blade of a wind turbine by means of vacuum infusion. The figure shows a solid mould part 210 with a top side matching the exterior side of the finished blade shell half. For illustrative reasons the top side of said mould part 210 is shown as being plane, but it is typically curved to the desired form of the blade shell half. First, a waxy substance is applied to the mould cavity of the mould part 210 in order to prevent the shell half to adhere to the surface. Subsequently, a so-called gel coat is placed on the inner side of the mould part 210, said gel coat later on forming the outside of the finished blade shell half. Above the gel coat is placed a fibre material consisting of a plurality of lower, preferably thin, fibre layers 214, above which a lower distribution layer 229 is placed. A fibre insertion 202 is placed on top of the lower distribution layer 229 and the fibre layers 214. A first core part 211 functioning as a filling material or sandwich material, such as balsa or PVC foam, is placed adjacent a first side of the fibre insertion 202, and a second core part 212 is placed adjacent a second side of the fibre insertion 202.

The fibre insertion 202 functions as a reinforcement section, also called a main laminate, of the blade and extends in the longitudinal direction of the blade shell part. The fibre insertion 202 comprises a plurality of fibre layers. The fibre insertion 202 comprises a first zone 221 at the first side of the fibre insertion 202 and a second zone 222 at the second side of the fibre insertion 202. The first zone 221 and the second zone 222 are separated in a transverse direction of the blade shell part by an intermediate zone 220.

An upper distribution medium 223 in form of a plate-like element provided with grooves 224 for distributing liquid polymer is placed above the intermediate zone 220 of the fibre insertion 202. The upper distribution medium 23 is also called a top hat in popular speak.

A fibre material in form of a plurality of upper, preferably thin, fibre layers 213 is placed above the top hat 223, fibre insertion 202, and the first and second core part 211, 212. The resin may be supplied via a device for providing polymer, which is laid into the mould part 210 on top of the upper fibre layers 213, so that it extends in the longitudinal direction of the mould part 210. The device for providing polymer thus includes a tear-off layer or a peel ply 240, for instance in form of a holey foil, a first vacuum outlet or vacuum channel 231 provided with a first semi-permeable membrane 232, a second vacuum outlet or vacuum channel 233 provided with a second semi-permeable membrane 234 as well as a number of resin inlet channels 225-228.

The top hat 223 is placed so that it overlaps the intermediate zone 220 of the main laminate 202, and the first vacuum channel 231 and the second vacuum channel 233 are placed so that they overlap the first 221 and the second zone 222 of the main laminate 202, respectively.

The lower distribution layer 229 can for instance be made from a porous core material, e.g. balsa or foamed polymer, provided with channels formed as recesses in the surface and extending in the plane of the distribution layer, often perpendicular to the longitudinal direction of the blade. The channels can, however, also extend at any other possible angle compared to the longitudinal direction of the blade. Alternatively, the lower distribution layer 229 is a net or a fibre mat with high permeability to liquid resin. The lower distribution layer 229 is in FIG. 10 depicted in an embodiment overlapping the entire main laminate 202. However, it is also possible to provide two different distribution layers, which overlap the first zone and the second zone, respectively, and which extend in below the intermediate zone 220 of the main laminate 202. The main importance is that the lower distribution layer or layers are arranged such that they are able to make contact with flow fronts of liquid resin propagating down through the intermediate zone 220 and through the first core part 211 and second core part 212, so that the flow fronts are drawn in below the first zone 221 and the second zone 222 of the main laminate 202.

At the top an airtight vacuum bag 250 is placed, together with the mould part 210 forming a mould cavity or equivalently a forming part with an interior. Furthermore, vacuum channels, e.g. in the form of perforated vacuum tubes, can be placed at the flanges, i.e. the rims, of the mould. Additionally, a number of inlet channels (not shown) can be provided above the first core part and the second core part, equivalently to the embodiment shown in FIG. 2.

The core parts 211, 212 may comprise any of the core blocks shown in FIGS. 3-9 or a combination of such blocks and core blocks known in the art. The core blocks are as previously described typically provided with channels extending in the plane of the core blocks perpendicular to and in the longitudinal direction of the blade shell half. The channels can also be formed by placing balsa blocks on a permeable cloth or net. These channels ensure that liquid polymer can propagate quickly in the plane of the core parts. The core parts need not, however, be balsa or foamed PVC, but can be of any other material with good flow qualities. This could for instance be a loosely woven mat of glass fibre or a similar net structure with high permeability and large capacity.

Typically, the core parts 211, 212 comprise a combination of core blocks of balsa wood and foamed PVC in order to optimise the weight and strength of the blade shell part.

During the process of filling the mould the first and the second vacuum channels 231, 233 and possibly other applied vacuum channels communicate with a vacuum source, and the inlet channels 225-228 communicate with a polymer source with liquid polymer. The vacuum in the vacuum channels creates a vacuum in the entire mould cavity between the mould part 210 and the vacuum bag 250, hereby drawing resin through the inlet channels 225-228 into the mould cavity as the polymer propagates through and impregnates the fibre materials 213, 214, 202 as well as the core parts 211, 212. When curing is completed, the vacuum bag 250 and the peel ply 240 are removed together with the vacuum channels 231, 232 and resin inlet channels 225-228.

For the resin inlet channels 225-228, Ω-shaped profile members or perforated tubes known per se can be used. The vacuum channels can also be formed as Ω-shaped profile members or perforated tubes. If perforated vacuum tubes are applied, they may be reinforced by a helical rigid member extending into the tube and preventing it from collapsing due to the vacuum.

However, the use of resin inlet channels under the vacuum bag 250 may cause problems, since the vacuum bag will press the inlet channels against the fibre layer or main laminate 202, which can leave impressions in these fibre layers or main laminate 202. These impressions may give rise to buckling effects during the subsequent use of the wind turbine blade, which could mean costly repairs of the blade or even replacement of the blade.

Such problems are reduced or completely remedied by the top hat 223. The top hat 223 balances or equalises this pressure to the entire lower surface of the top hat 223 and thus prevents the formation of impressions in the main laminate 202. The top hat 223 is tapered towards the sides of the top hat 223 in order to obtain a gradual transition between different materials of the finished shell part; this again being in order to prevent the formation of boundaries with a discontinuous stiffness or strength, thus minimising the probability of the afore-mentioned buckling effects. In order to keep the top hat 223 as thin as possible, it is usually made of balsa wood. However, it could also be made of foamed polymer. The grooves of the top hat 223 may have any of the configurations shown in FIGS. 3-9. However, it can also be provided with first grooves formed in the upper surface and extending in the longitudinal direction and with second grooves formed in the lower surface and extending in the transverse direction, upper and lower surface being connected by a number of through-going holes. Alternatively, the grooves can be formed equivalent to the grooves of the core blocks shown in FIGS. 3-9.

It is not shown in FIG. 10, but the leading edge and the trailing edge of the blade shell part typically have rim reinforcements of fibre material as shown in FIG. 2.

During the process of filling the mould, liquid resin flows from the inlet channels 225-228 into the mould cavity due to the vacuum in the mould cavity defined by the mould part 210 and the vacuum bag 250. Due to the vacuum in the entire mould cavity, the liquid polymer is both drawn towards the leading edge and trailing edge of the blade shell part and into the fibre insertion 202.

FIGS. 11a-h show how the fibre material of the main laminate 202 is impregnated with liquid resin during the process of filling the mould. Prior to the start of the process of filling the mould, air is evacuated in the mould cavity by means of the first and the second vacuum channel 231, 232 and possibly other vacuum channels, which e.g. can be placed at the leading edge and/or trailing of the blade shell part. The evacuation of the air creates a vacuum which is to be understood as a negative pressure in the mould cavity.

Figure 11A:
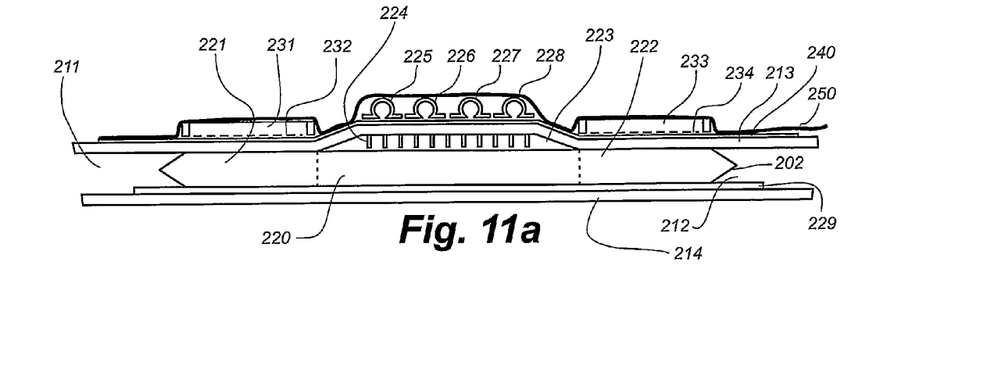
FIGS. 11a-h are schematic cross sections showing how liquid polymer is distributed in the fibre insertion by the method according to the invention.
Figure 11B:
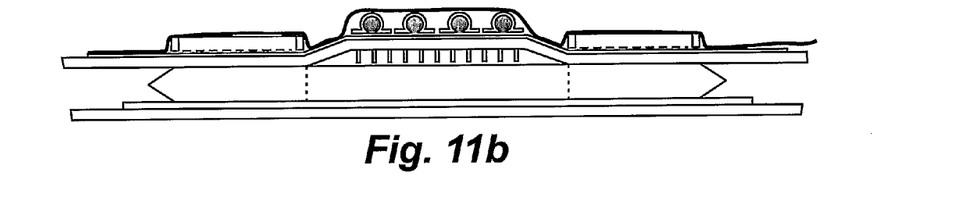
Figure 11C:
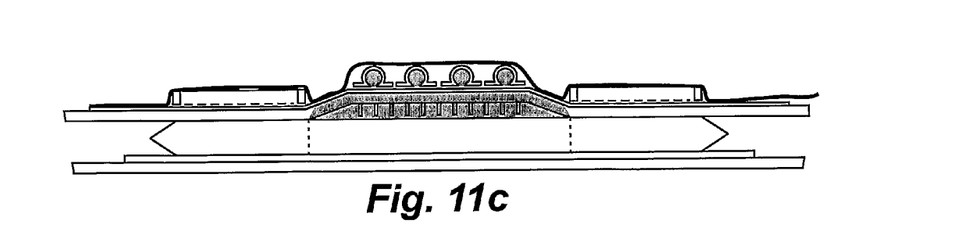
Figure 11D:
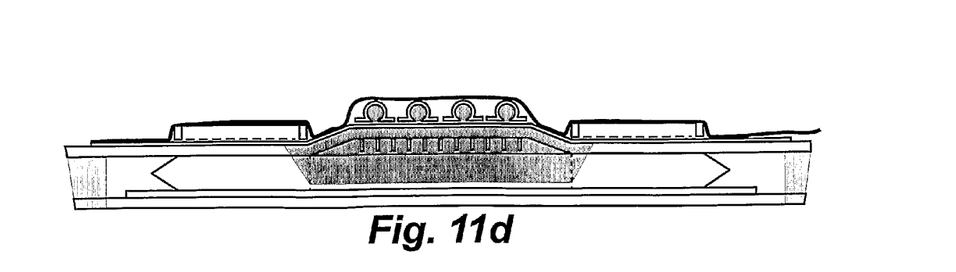

FIG. 11b diagrammatically shows the start of the process of filling the mould, where the inlet channels 225-228 are filled with liquid polymer, indicated by the grey tinted areas. At the start of the process of filling the mould, liquid polymer is directed to the top hat 223, the grooves 224 of which are quickly filled with resin as shown in FIG. 11c. Hereafter the polymer slowly spreads down through the main laminate 202 as shown in FIG. 11d, as the liquid polymer creates a wide flow front moving down through the intermediate zone 220. At the same time, some of the polymer is drawn into the first zone 221 and the second zone 222 towards the first semi-permeable membrane 232 and the second semi-permeable membrane 234, respectively.

At the beginning of the filling process, the resin is supplied only from the inlet channels 225-228 above the top hat 223 for a predetermined amount of time, for instance 30 minutes. Subsequently, resin is additionally supplied from additional resin inlet channels (not shown) arranged over the first core part 211 and second core part 212, respectively, thus creating flow fronts propagating through the resin distribution networks of these core parts. These flow fronts are shown at both sides of FIG. 11d. The additional resin inlet channels can be arranged equivalently to the embodiment shown in FIG. 2.

Figure 11E:
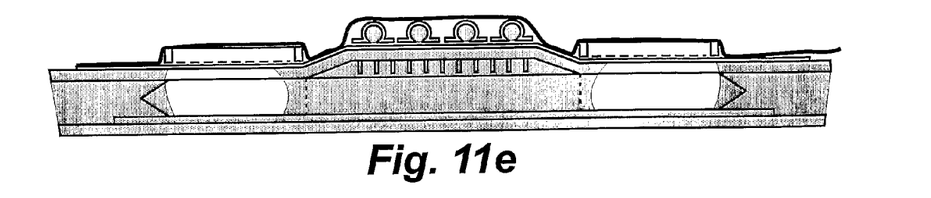
Figure 11F:
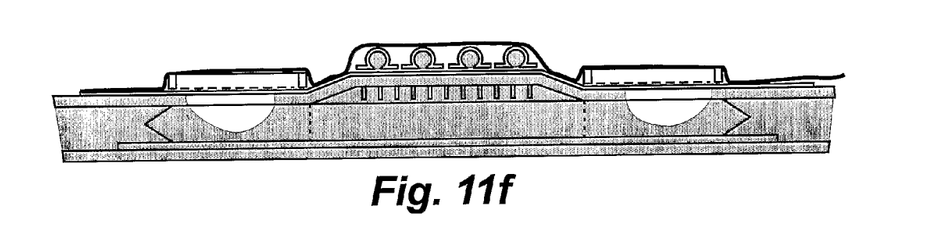
Figure 11G:
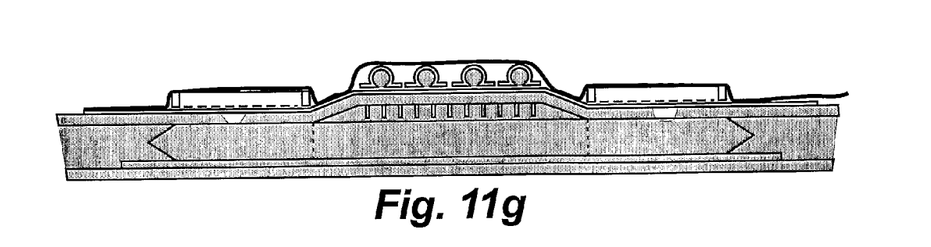
Figure 11H:
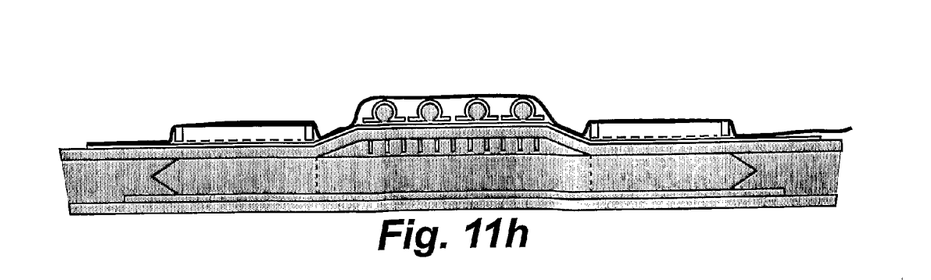

When the three flow fronts reach the lower distribution layer 229 as shown in FIG. 11e, the resin quickly spreads herein and thus in below the first zone 221 and second zone 222 of the main laminate 202. Subsequently, as shown in FIG. 11f, the flow fronts move upwards through the first zone 221 and the second zone 222 and finally, as shown in FIG. 11g, form desired v-shapes ensuring that no air pockets arise. At the end, the entire main laminate 202 is impregnated as shown in FIG. 11h, whereafter the curing process is started.

The top hat 223 ensures that liquid polymer propagates in the main laminate 202 with a relatively wide flow front on the way down through the intermediate zone 220, and the lower distribution layer 229 ensures a wide flow front on the way up through the first zone 221 and the second zone 222. As the width of the main laminate is often many times the size of the thickness of the main laminate, it is ensured that the flow front of polymer is to move the shortest distance possible, whereby the impregnation time can be reduced. Since the resin only needs to stay liquid for a shorter time, the subsequent curing time can also be reduced. Thereby the total time for manufacturing e.g. a blade for a wind turbine can be reduced substantially, which means that the total production time can be reduced to fewer working-shifts than with previously used methods. Thereby, the overall production cost can be lowered substantially.

To ensure that the flow front of polymer only moves slowly transversely in the main laminate 202 towards the first zone 221 and the second zone 222, the material of the main laminate 202 can be structured in such a way that it has a higher permeability across the fibre layers than in the plane of the fibre layers.

To ensure that air pockets do not arise during the process of impregnation it is furthermore important that the thickness of the main laminate 202 and the width of the intermediate zone 220 are mutually dimensioned appropriately.

The inlet channels 225-228 can be dimensioned so that a large amount of liquid polymer can flow through them. At the end of the process of filling the mould the polymer source can be closed prior to closing the vacuum source, whereby the inlet channels 7, 8 can be emptied of liquid polymer more easily. This reduces the polymer wastage.

The vacuum channels 231, 233 can be formed by the semi-permeable membrane 232, 234 and a cloth, wherein spacer material can be placed in the form of a three-dimensional net or the like in order to ensure that the membrane 232, 234 and the cloth do not collapse during the process of filling the mould, during which a vacuum is established in the vacuum channel 231, 233.

EXAMPLE

According to a given prototype of a LM61.5 wind turbine blade, the width of the main laminate differs in the longitudinal direction of the blade. The main laminate is approximately 850 mm wide and has a thickness of approx. 42 mm at the widest and thickest part, respectively. The width of the top hat also varies in the longitudinal direction of the blade and is approximately 360-370 mm at the widest part and 150 mm at the slimmest part.

The core blocks have the following dimensions: w=1-1.2 mm, d=30 mm, $h_2$=2.5+/−0.5 mm, α=14 degrees, and t=1 mm. The core blocks have varying thickness h, and therefore the height of the first grooves is also varying. The overlap between the first grooves and the second grooves are equal to $h_2$ minus t and is thereby 1.5-2.0 mm.

The examples have been described according to preferred embodiments. However, the invention is not limited to these embodiments. For example, the width and height of the individual grooves as well as the distance between grooves should be dimensioned in order to obtain the optimum trade-off between an efficient distribution of the liquid resin during the impregnation process and a subsequent weight distribution of the cured resin. It is also clear, that the overlap between first grooves and second grooves should be optimised in order to supply liquid resin from the first surface to the second surface with a desired speed. Thus, this overlap should neither be too small nor too large.

List Of Reference Numerals
1 wind turbine blade shell part
2, 102, 202 main laminate/fibre insertion
3 small main laminate/small fibre insertion
4, 104 leading edge
5, 105 trailing edge
7 blade root
8 tip end
30 core block
31 first grooves
32 second grooves
33 additional grooves
35 first surface
36 second surface
37' tapered region
40 first core block
45 first fibre layer
50 second core block
60 first core block
65 first fibre layer
70 second core block
75 second fibre layer
85 additional fibre layer
110, 210 mould part
111, 211 first core part
112, 212 second core part
113, 213 upper fibre layer(s)
114, 214 lower fibre layer(s)
115 first fibre reinforcement
116 second fibre reinforcement
125-126 resin inlet channels
150, 250 vacuum bag
160 first additional vacuum outlet
165 second additional vacuum outlet
170 first additional resin inlet channel(s)
175 second additional resin inlet channel(s)
220 intermediate zone
221 first zone
222 second zone
223 plate-like distribution medium/top hat
224 grooves
225-228 resin inlet channels
229 lower distribution layer
231 first vacuum outlet
232 first semi-permeable membrane
233 second vacuum outlet
234 second semi-permeable membrane
240 tear-off layer/holey foil/peel ply

The invention claimed is:

1. A method for producing a composite structure comprising fiber reinforced material by means of vacuum assisted resin transfer molding, where the fiber reinforced material is impregnated with liquid resin, the method comprising:
   a) providing a mold comprising a rigid mold part and a flexible vacuum bag,
   b) placing a fiber insertion in the mold part, the fiber insertion including a plurality of fiber layers and, when the fiber insertion is placed in the mold part, the fiber insertion having an upper surface and a lower surface as well as a first side and a second side, the fiber insertion including a first zone at the first side and a second zone at the second side, the first zone and the second zone being separated by an intermediate zone,
   c) placing an upper distribution medium above the intermediate zone of the fiber insertion, the distribution medium comprising a resin distribution network for distributing resin along the upper distribution medium,
   d) placing a number of resin inlet channels above the upper distribution medium for supplying liquid resin to the resin distribution network,
   e) placing a first vacuum outlet at least partially overlapping the first zone of the fiber insertion and a second vacuum outlet at least partially overlapping the second zone of the fiber insertion,
   f) placing the vacuum bag on top of the mold part, thus sealing the vacuum bag against the mold part to define a mold cavity,
   g) evacuating the mold cavity,
   h) connecting a source of uncured fluid resin to the resin inlet channels so as to feed uncured resin to the resin distribution network in order to fill the mold cavity and to impregnate at least the fiber insertion and the upper distribution medium with uncured resin, and
   i) allowing the resin to cure in order to form the composite structure.

2. A method according to claim 1, wherein a lower distribution medium is provided below the fiber insertion, the lower distribution medium at least partially overlapping the first zone and the second zone of the fiber insertion.

3. A method according to claim 1, wherein the upper distribution medium is formed as a load distributing plate-like element.

4. A method according to claim 1, wherein the upper distribution medium is made of a lightweight, essentially rigid material, such as balsa wood or foamed polymer.

5. A method according to claim 3, wherein the upper distribution medium, when placed above the fiber insertion, comprises an upper surface and a lower surface, a number of first grooves being formed in the upper surface of the distribution medium and a number of second grooves being formed in the lower surface of the distribution medium.

6. A method according to claim 3, wherein the plate-like distribution medium comprises a first side and a second side, and wherein the distribution medium is tapered towards the first side and/or the second side.

7. A method according to claim 1,
wherein the fiber insertion has a first width and the plate-like distribution medium has a second width, and
wherein the ratio between the second width and the first width is 20-60% or alternatively 25-55% or alternatively 30-50%.

8. A method according to claim 1, wherein prior to step b) a plurality of fiber layers is placed in the mold cavity, and a gel coat is applied defining the exterior of the composite structure.

9. A method according to claim 1, wherein a plurality of fiber layers is placed in the mold cavity between steps c) and d), said plurality of fiber layers defining the interior of the composite structure.

10. A method according to claim 1, wherein the fiber insertion constitutes a main laminate, which is a longitudinally extending reinforcement section in a blade shell half for a blade of a wind turbine.

11. A method according to claim 1, wherein additionally a core material is provided adjacent the first side of the fiber insertion and adjacent the second side of the fiber insertion.

12. A method according to claim 11, wherein one or more additional resin inlet channels are placed above the core material.

13. A method according to claim 12,
wherein resin is first supplied via the resin inlet channels above the upper distribution medium for a predetermined amount of time, and
wherein the resin is then supplied via the resin inlet channels above the core material.

\* \* \* \* \*